United States Patent [19]

Gregory

[11] 4,355,829
[45] Oct. 26, 1982

[54] GATE LATCH

[76] Inventor: James E. Gregory, R.R. #1, Box 130, Fort Madison, Iowa 52627

[21] Appl. No.: 220,861

[22] Filed: Dec. 29, 1980

[51] Int. Cl.³ .............................................. E05C 5/02
[52] U.S. Cl. ...................................... 292/68; 292/216
[58] Field of Search ....................... 292/68, 67, 69, 63, 292/78, 79, 213, 216

[56] References Cited

U.S. PATENT DOCUMENTS

| | | | |
|---|---|---|---|
| 394,685 | 12/1888 | Fether | 292/216 X |
| 538,078 | 4/1895 | Kerler | 292/63 X |
| 965,125 | 7/1910 | Terrell | 292/78 |
| 997,335 | 7/1911 | Smith | 292/213 |
| 1,134,301 | 4/1915 | Voorhees et al. | 292/216 |
| 1,175,349 | 3/1916 | Fleming | 292/207 |
| 1,904,291 | 4/1933 | Nielson et al. | 292/67 |
| 2,381,633 | 8/1945 | Young | 292/207 X |
| 2,666,660 | 1/1954 | Youngworth | 292/68 |
| 3,774,947 | 11/1973 | Duncan | 292/68 |
| 3,877,738 | 4/1975 | Nelson | 292/68 |
| 4,176,869 | 12/1979 | Gilst | 292/67 |

Primary Examiner—Richard E. Moore
Attorney, Agent, or Firm—Henderson & Sturm

[57] ABSTRACT

A gate latch, especially for animal-restraining enclosures, adapted to retain and release a gate hinged at one edge for swinging about an upright axis. The post toward and away from which the unhinged edge of the gate swings carries means providing a horizontal ledge which carries an upright pivot member for both axial and angular movement about an upright axis. A slotted plate is fixed to the member to swing and raise and lower therewith. Means biases the plate and member downwardly. The slot in the plate enters inwardly from one edge of the plate and, when the gate is open, the slot lines up generally with the arc of swinging of pintle means on the unhinged side of the gate so as to receive the closing gate. When the gate fully closes, the force thereof swings the plate so that the slot is crosswise of the arc of swinging, and retainer means between the plate and the ledge, effective because of the biasing means, locks the gate closed until the plate and member are manually raised and turned to release the gate for opening.

6 Claims, 4 Drawing Figures

GATE LATCH

BRIEF SUMMARY OF THE INVENTION

Many forms of gate latches have been provided in the past, the most familiar of which is the type used on wire mesh fences, comprising a U-shaped member pivoted to turn about its supporting post and also pivoted to raise and lower about a horizontal axis. The member, when down, retains the gate in its unhinged edge between the furcations of the member. When raised, the member clears the unhinged edge of the gate. See, for example, U.S. Pat. Nos. 3,877,738, 2,666,660 and 3,774,947. Other types of locks or latches are used for cam action to close doors, hatches, etc., but these are complicated, costly and not applicable to gates of the type forming the subject matter of this application. See, for example, U.S. Pat. No. 1,175,349 and 2,381,633.

The present invention features a simple and inexpensive gate latch that is positive in action and one that resists the native ingenuity of animals to effect release thereof. In this respect, the lock means should be located at a relatively high position; e.g., at the top of the gate, so as to further defy attempts of the animals to release it. Also, the handle is preferably positioned outside the plane of the gate and out of reach of the animals. The plate and pivot member provide a simple control, working in unison and biased to locking position, which also effectuates a retainer means that keeps the latch down and locked when the gate is closed. The plate and member may be manually raised against the force of the biasing means to release the retainer and then turned outwardly to reposition the plate slot for release of the pintle means on the gate. The biasing means comprises a coiled spring about a depending portion of the pivot member and acting between the underside of the ledge and a stop spaced downwardly on the pivot member. The stop is removable to enable downward removal of the spring and upward removal of the plate and member and for the reverse thereof to permit easy assembly. This also enables simple packaging and shipping of the parts in "knocked-down" condition.

DESCRIPTION OF THE PREFERRED EMBODIMENT OF THE INVENTION

Figure 2:
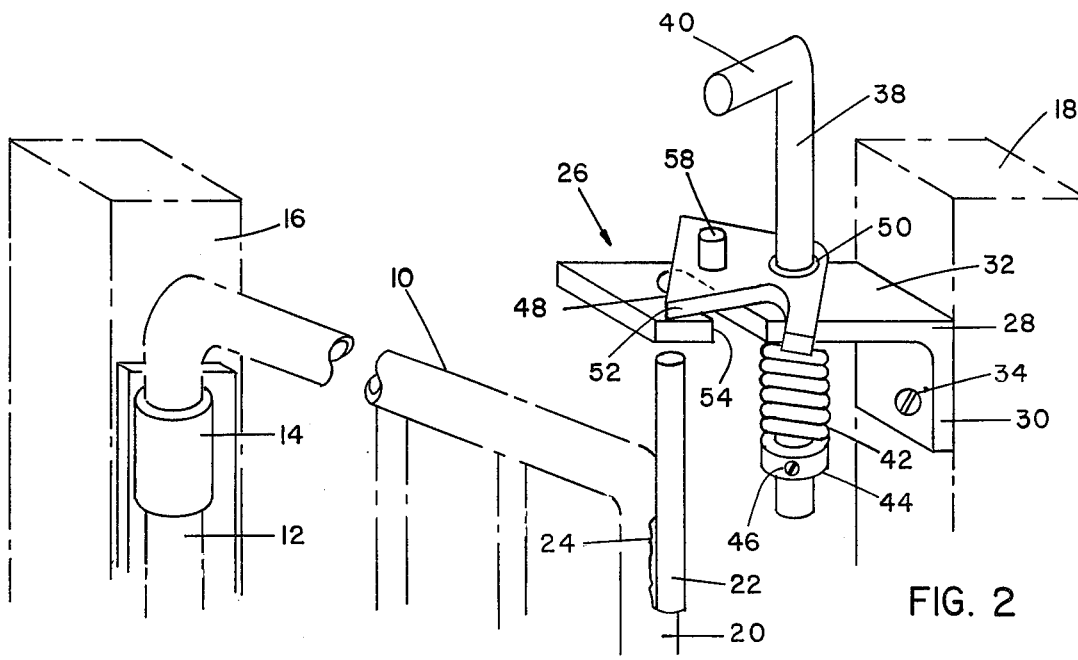
FIG. 2 is a similar view in unlocked condition, showing also a representation of the hinging of the gate.

Reference will be had first to FIG. 2, wherein the numeral 10 indicates a typical gate hinged at one end 12 at 14 for swinging about an upright axis relative to a main supporting post 16 and toward and away from a second post 18. The free or unhinged edge of the gate is indicated at 20 and preferably has affixed thereto upstanding pintle means 22, the affixation being accomplishes, for example, by welding at 24.

As will be brought out in more detail below, the gate may be the same at both sides so as to the provision of pintles and may have them at both top and bottom for use of the latches (to be described) as pairs at each side and for selective swinging from either hinge axis; that is, when one set of latches is locked, they will serve as a hinge while the other set is locked and unlocked.

The improved gate latch is designated in its entirety by the numeral 26. This latch includes a base part in the form of an angle iron 28 having a depending leg 30 flatwise against the post 18 and its horizontal leg 30 providing a ledge. The means for mounting the angle member on the post 18 may take many forms, that being shown comprising screw means 34 so that the latch may be used with existing gate structures, which involves also welding the pintle means to an existing gate.

The foregoing pertains to the attachment of the ledge member to a wooden post. For the mounting on a steel post, the ledge may be a plate simply welded to such post.

Figure 4:
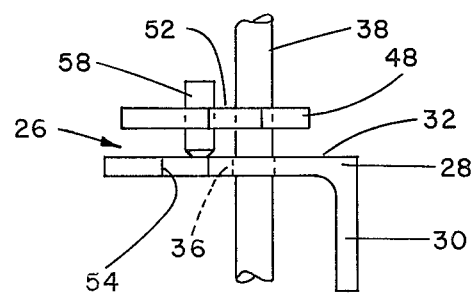
FIG. 4 is a side view of the structure shown in FIG. 3.

The ledge has a vertical opening 36 therein (See FIG. 4) for receiving an upright pivot member 38 for both axial and angular movement relative to the ledge. The upper part of this member is bent at right angles to provide handle means 40 for effecting manual raising and turning of the member. The lower part of the member extends through and depends below the ledge and is biased downwardly by biasing means preferably in the form of a coiled compression spring 42 which acts at one end against the underside of the ledge and at its other end against a stop 44. The stop may be held fast to the member 38 as by a set screw 46 so that the spring may be removed downwardly and the member withdrawn upwardly from the ledge, as for repair, replacement, etc. In reverse order, the assembly of the latch is facilitated as for packaging, shipping, etc. If desired, the stop may be welded in place and the set screw dispensed with.

Figure 1:
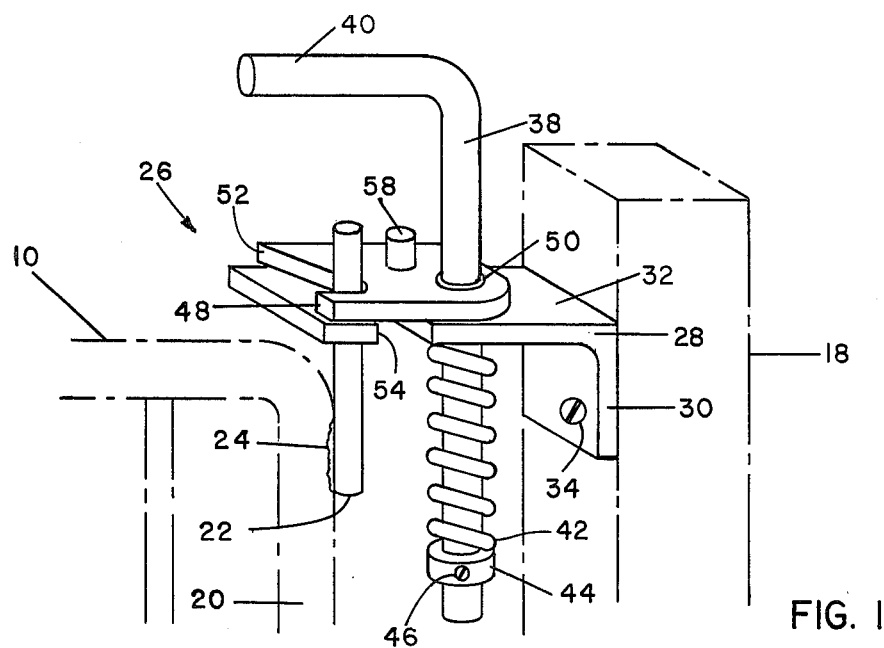
FIG. 1 is a perspective of the gate latch in closed position relative to the unhinged edge of a gate.
Figure 3:
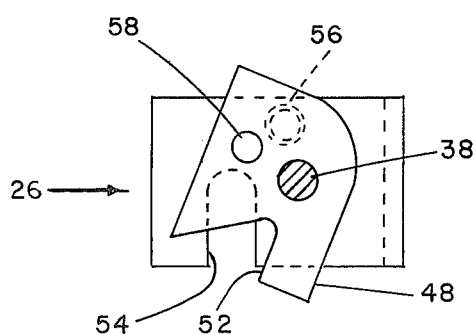
FIG. 3 is a plan of the latch in locked position, a portion of the handle being omitted.

A horizontal plate 48 overlies the ledge 32 and is fixed to the member 38 as by welding at 50 so as to move vertically and angularly with the member. The plate is provided with a V-shaped slot 52 entering from one edge. When the plate is in its open or pintle-receiving position (See FIGS. 2, 3, and 4), this slot opens substantially in line with the arc of swinging of the pintle means as the gate is turned about its hinge means. When in closed position (FIG. 1), the slot is crosswise of the path of movement of the pintle means. A stop in the form of a slot 54 in the ledge is engaged by the pintle means when the gate attains its closed position and prevents the gate from over-swinging. The ledge has a second vertical opening 56 therein (See FIG. 3) to receive a depending lug or pin 58, fixed to the plate, when the plate is in its locking or retaining position; that is, when the plate reaches this position the lug, riding on top of the ledge as the plate swings, drops into the opening 56 under action of the spring 42, thus forming retaining means to hold the latch against inadvertent opening. In this position, the now crosswise plate slot 52 confines the pintle means between its crosswise front edge and the closed rear end of the ledge slot 54.

When it is desired to release the latch, the member 38 is manually raised via the handle 40, thus releasing the lug 58 from the ledge opening 56, whereupon the handle and plate may be turned in unison to move the plate angularly to re-position the plate and slot, the lug again riding on top of the plate. The handle may be turned to effect initial swinging of the gate via the pintle means or the gate itself may be moved per se to turn the plate. During closing, the pintle means enters the slot, striking its angled rear edge and forcing the plate to turn again inwardly until the retainer lug 58 drops into the ledge opening 56 to again latch the gate in closed position.

As previously mentioned, the latches may be used in pairs (upper and lower) at each side of the gate. In such case, the member 38 will be extended downwardly and be welded to a lower plate 48 of a lower latch means 26 (not shown). Also, the latches will be inverted so that the weight of the gate will rest on the respective ledges, which will be clear from the representative disclosure presented hereinbefore. When the latches are used at both sides of the gate, the upper and lower latches at one side are locked and, being vertically coaxial, serve as the hinge while the latches at the other side are selectively releasable and lockable. This provides selectivity as to the choice of sides at which the gate may be hinged.

Many features of the invention, not enumerated here, will become apparent to those versed in the art, as will modifications and alterations in the preferred embodiment, all of which may be achieved without departure from the spirit and scope of the invention.

I claim:

1. A latch for releasably locking a vertically hinged gate in closed position relative to a fixed support toward and away from which the unhinged edge of the gate swings respectively between closed and open positions, comprising: a base member having means for the rigid affixation thereof to the support and including a horizontal ledge projecting from the support toward the unhinged edge of the gate when in its closed position, said ledge having a vertical opening therein, an upright pivot member carried by the ledge via said opening for both angular and vertical movement relative to the ledge about a vertical axis, means cooperative between the member and ledge for biasing the member normally downwardly, a horizontal plate overlying the ledge and affixed to the member for movement with the member between angularly spaced apart latching and unlatching positions, said plate having a slot leading in from one edge thereof, said slot, in the unlatching position of the plate, opening toward the path of swinging of the gate toward its closed position and, in the latching position of the plate lying crosswise of said path, pintle means on the unhinged edge of the gate for entering the plate slot during closing of the gate when the plate is in its unlatching position and for retention in the slot when the plate is turned by the force of the closing gate to its latching position, retainer means engageable between the plate and ledge when the plate is in its latching position and disengageable from the ledge when the plate is lifted against the force of the biasing means and turned to its unlatching position, and handle means on the pivot member for manually raising and turning the plate to its unlatching position whereby the plate slot may release the pintle means.

2. The gate latch of claim 1, including stop means on the ledge for engagement with the pintle means to prevent swinging of the gate beyond its closed position.

3. The gate latch of claim 2, in which the stop comprises a slot in the ledge opening toward the pintle means, the closed end of said slot being engaged by the pintle means to limit swinging of the gate.

4. The gate latch of claim 1, in which the retainer means includes an opening in the ledge and a lug on the plate receivable in the opening when the plate is in its latching position and disengageable from the opening when the plate and pivot member are raised and turned.

5. The gate latch of claim 1, in which the biasing means comprises a stop fixed to the pivot member in spaced relation to the bottom of the ledge and a coiled compression spring coaxial about the pivot member below the ledge and acting between the bottom of the ledge and the stop.

6. The gate latch of claim 5, in which the stop is axially downwardly removable to enable downward removal of the spring and upward removal of the plate and pivot member from the ledge.

* * * * *